US010016835B2

(12) United States Patent
Nakajima

(10) Patent No.: US 10,016,835 B2
(45) Date of Patent: Jul. 10, 2018

(54) METHOD FOR GRINDING ELECTRODE TIP

(71) Applicant: Kyokutoh Co., Ltd., Aichi (JP)

(72) Inventor: Kotaro Nakajima, Aichi (JP)

(73) Assignee: KYOKUTOH CO., LTD, Nagoya (JP)

( * ) Notice: Subject to any disclaimer, the term of this patent is extended or adjusted under 35 U.S.C. 154(b) by 658 days.

(21) Appl. No.: 14/520,911

(22) Filed: Oct. 22, 2014

(65) Prior Publication Data
US 2015/0044945 A1 Feb. 12, 2015

Related U.S. Application Data

(63) Continuation of application No. PCT/JP2013/006817, filed on Nov. 20, 2013.

(30) Foreign Application Priority Data

Nov. 20, 2012 (JP) ................. 2012-254688

(51) Int. Cl.
*B23K 11/30* (2006.01)
*B24B 49/16* (2006.01)
(Continued)

(52) U.S. Cl.
CPC ......... *B23K 11/3063* (2013.01); *B23K 11/115* (2013.01); *B23K 11/315* (2013.01); *B24B 19/16* (2013.01); *B24B 49/16* (2013.01)

(58) Field of Classification Search
CPC ..... B23K 11/3063; B24B 19/16; B24B 29/08; B24B 49/10; B24B 49/16
See application file for complete search history.

(56) References Cited

U.S. PATENT DOCUMENTS 4,186,527 A * 2/1980 Hausermann ......... B24B 35/005
219/69.2
4,557,075 A * 12/1985 Ullmann .................. B23H 7/28
219/69.2
(Continued)

FOREIGN PATENT DOCUMENTS

JP 5-24176 U 0/1993
JP 2003-103378 4/2003
(Continued)

OTHER PUBLICATIONS

International Search Report for corresponding International Application No. PCT/JP2013/006817 dated Dec. 24, 2013.
(Continued)

*Primary Examiner* — Peter DungBa Vo
*Assistant Examiner* — Marcel Dion
(74) *Attorney, Agent, or Firm* — Renner, Otto, Boisselle & Sklar, LLP

(57) ABSTRACT

Provided is a method for grinding electrode tips such that the method is capable of detecting irregular grinding when the maximum torque does not occur. Specifically, a tip dresser includes a holder holding a cutter, a servo motor unit allowing the holder to rotate, and a controller controlling the operation of the servo motor unit. The servo motor unit outputs a torque occurrence signal to the controller when a load torque reaches a predetermined value in regular grinding of a pair of electrode tips. The controller detects irregular grinding when not receiving the torque occurrence signal within a time that corresponds to an elapsed time in the regular grinding.

1 Claim, 8 Drawing Sheets

(51) Int. Cl.
*B23K 11/11* (2006.01)
*B23K 11/31* (2006.01)
*B24B 19/16* (2006.01)

(56) References Cited

U.S. PATENT DOCUMENTS

| | | | |
|---|---|---|---|
| 5,545,872 A * | 8/1996 | Nakajima | B23K 11/314 219/86.51 |
| 6,024,521 A * | 2/2000 | Swaggerty | B23K 11/3063 409/131 |
| 6,518,537 B1 * | 2/2003 | Tezawa | B23K 11/3063 219/119 |
| 2004/0149692 A1 | 8/2004 | Masanori | |
| 2015/0034608 A1 * | 2/2015 | Mori | B23K 11/115 219/86.1 |

FOREIGN PATENT DOCUMENTS

| | | |
|---|---|---|
| JP | 2006-341271 | 12/2006 |
| JP | 2008-207189 A | 9/2008 |
| JP | 2010-017748 | 1/2010 |
| JP | 2010-036232 | 2/2010 |

OTHER PUBLICATIONS

Form PCT/ISA/237 for corresponding International Application No. PCT/JP2013/006817 dated Dec. 24, 2013.

* cited by examiner

METHOD FOR GRINDING ELECTRODE TIP

CROSS-REFERENCE TO RELATED APPLICATIONS

This is a continuation of International Application No. PCT/JP2013/006817 filed on Nov. 20, 2013, which claims priority to Japanese Patent Application No. 2012-254688 filed on Nov. 20, 2012. The entire disclosures of these applications are incorporated by reference herein.

BACKGROUND

The present disclosure relates to methods for grinding electrode tips using a tip dresser including a servo motor unit.

Conventionally, when a pair of electrode tips mounted on a welding gun of a spot welding, a tip dresser including a servo motor unit is used since the tip dresser easily receives and outputs a signal to and from a welding robot having a welding gun (for example, see Japanese Unexamined Patent Publication No. 2003-103378).

SUMMARY

However, in a tip dresser including a conventional servo motor unit, the servo motor unit merely operated so as to reduce a load when the maximum torque (stall torque) occurred in a servo motor. It was impossible to detect irregular grinding of electrode tips when the maximum torque did not occur, and this had been inconvenient.

The present disclosure has been developed to solve the above problem, and it is an object of the present disclosure to provide a method for grinding electrode tips such that the method is capable of detecting irregular grinding when the maximum torque does not occur.

A method for grinding a pair of electrode tips, according to the present disclosure, held in a welding gun by a tip dresser including a holder holding a cutter capable of cutting ends of the pair of the electrode tips, a servo motor unit having a servo motor serving as a driving source for allowing the holder to rotate and a servo amplifier controlling the rotation of the servo motor such that the pair of the electrode tips are able to be cut, and a controller controlling an operation of the servo motor unit, the method capable of detecting irregular grinding of the electrode tips if a load torque of the servo motor is a maximum torque or less when the tip dresser grinds the electrode tips, includes outputting at least one torque occurrence signal from the servo motor unit to the controller when the load torque reaches a predetermined value within a range of the load torque in regular grinding of the pair of the electrode tips, wherein the controller detects the irregular grinding when not receiving the at least one torque occurrence signal within a corresponding elapsed time in the regular grinding.

In the method of grinding electrode tips according to the present disclosure, in the grinding of the electrode tips, unless the controller receives a torque occurrence signal having a predetermined value from the servo motor unit within the time corresponding to the elapsed time in the regular grinding, the controller can detect the irregular grinding since the electrode tips are irregularly grinded, and output a signal for reporting irregularity to, for example, the control unit of a welding robot having the welding gun.

Therefore, with the method for grinding the electrode tips according to the present disclosure, it is found that the irregularity is caused because the welding gun holding the electrode tips is positioned in another tip dresser, the servo motor is kept idle, etc., and the irregular grinding of the servo motor when the maximum torque does not occur can be detected.

In the method of the electrode tips according to the present disclosure, it is preferable that a waveform of the load torque of the servo motor in the regular grinding with time elapsed is such that the load torque increases to reach the first peak value since a start of grinding (after starting pressurization of the electrode tips along with the contact of the electrode tips with the holder), then, the load torque decreases, and after the decrease, the load torque reaches the second peak value that is higher than the first peak value, and is retained to end grinding, the at least one torque occurrence signal includes two torque occurrence signals, one of which corresponds to a higher torque value or more, and the other of which corresponds to a lower torque value or more, the higher and lower torque values being sequentially higher or more as the predetermined value within the range of the load torque in the regular grinding of the pair of the electrode tips, the servo motor unit is configured to output the two torque occurrence signals to the controller when the load torque reaches two of the higher and lower torque values or more as the predetermined value within the range of the load torque predetermined, the lower torque value is lower than a minimum value obtained at a time after the first peak value and before the second peak value, and the higher torque value is set to be lower than the second peak value and higher than the first peak value, and the controller detects the irregular grinding when not receiving the torque occurrence signal corresponding to the lower torque value or more within a corresponding elapsed time in the regular grinding, and the torque occurrence signal corresponding to the higher torque value or more within a corresponding elapsed time in the regular grinding.

In such a grinding method, for example, even if the operation of the grinding is started (the rotation of the servo motor is started), the controller may not receive the torque occurrence signal corresponding to the lower torque value from the servo motor unit. At that time, as stated above, that is because the welding gun holding the electrode tips is positioned in another dresser, the servo motor is kept idle, etc. Therefore, the irregular grinding of the servo motor when the maximum torque does not occur can be detected.

The controller, though receiving the torque occurrence signal corresponding to the lower torque value or more from the servo motor unit after grinding is started (after starting pressurization of the electrode tips along with the contact of the electrode tips with the holder), may not receive the torque occurrence signal corresponding to the higher torque value or more. This is because, though the tip dresser is not mechanically broken, the end of the electrode tip is deformed (worn out) too much, the electrode tips are inappropriately held in the shanks of the welding gun and is kept idle, the welding gun insufficiently pressures the tip dresser, etc., and therefore, the irregular grinding of the servo motor when the maximum torque does not occur can be detected.

Furthermore, if the controller receives the torque occurrence signal corresponding to the lower torque value or more and the torque occurrence signal corresponding to the higher torque value, in sequence, from the servo motor unit within the predetermined time after the start of the grinding, it can be determined that the regular grinding operation of the electrode tips is ended.

Even if the controller receives the torque occurrence signal corresponding to the lower torque value or more and the torque occurrence signal corresponding to the higher torque value or more in sequence after the start of the grinding from the servo motor unit, its elapsed time may be too short. That is because the grinded electrode tip has a different shape, the cutter cannot cut due to, for example, the end of its life, etc. In such cases, the irregular grinding of the servo motor when the maximum torque does not occur can also be detected.

If the controller receives the torque occurrence signal corresponding to the lower torque value or more and the torque occurrence signal corresponding to the higher torque value or more, in sequence, from the servo motor unit within the predetermined elapsed time, and the regular grinding time has elapsed, the controller can determine the end of the regular grinding operation of the electrode tips stop further grinding to prevent the electrode tips from being cut too much, leading to reduction of the consumption amount of the electrode tips.

Furthermore, it is preferable that the at least one torque occurrence signal includes the two torque occurrence signals corresponding to the lower torque value or more and the higher torque value or more, and another torque occurrence signal corresponding to an intermediate torque value or more between the lower torque value and the higher torque value, the servo motor unit is configured to output, to the controller, the another torque occurrence signal when the load torque reaches the intermediate torque value or more, the intermediate torque value is set to be lower than the higher torque value and higher than the first peak value, and the controller detects irregular grinding when not receiving the torque occurrence signal corresponding to the lower torque value or more within the corresponding elapsed time in the regular grinding, the torque occurrence signal corresponding to the intermediate torque value or more within a corresponding elapsed time in the regular grinding, and the torque occurrence signal corresponding to the higher torque value or more within the corresponding elapsed time in the regular grinding.

With such a grinding method, during the grinding of the electrode tips, the controller also receives the torque occurrence signal if the load torque reaches the intermediate torque value or more. Therefore, the irregular grinding can also be detected with the presence or absence of the torque occurrence signals corresponding to the intermediate value between the lower torque value and the higher torque value in addition to the lower torque value or more and the higher torque value or more, leading to quick and efficient detection of the irregular grinding.

In other words, during the grinding, for example, the controller may not receive the torque occurrence signal corresponding to the lower torque value or more from the servo motor unit even after the start of the rotation of the servo motor. That is because, as stated above, the welding gun holding the electrode tips is positioned in another dresser, the servo motor is kept idle, etc., and the irregular grinding of the servo motor when the maximum torque does not occur can be detected.

After the start of the grinding, although receiving the torque occurrence signal corresponding to the lower torque value or more from the servo motor unit, the controller may not receive the torque occurrence signal corresponding to the intermediate torque value or more. That is because the ends of the electrode tips are deformed (worn out) too much though the tip dresser is not mechanically broken, the electrode tips are inappropriately held in the shanks of the welding gun and is kept idle, the welding gun insufficiently pressures the tip dresser, etc. The irregular grinding of the servo motor when the maximum torque does not occur can be detected.

Furthermore, after the start of the grinding, although receiving the torque occurrence signals corresponding to the lower torque value or more and the intermediate torque value or more in sequence from the servo motor unit, the controller may not receive the torque occurrence signal corresponding to the higher torque value or more. That is because the ends of the electrode tips are extremely deformed, etc. The irregular grinding of the servo motor when the maximum torque does not occur can be detected.

Furthermore, after the start of the grinding, if the controller receives, from the servo motor unit, the torque occurrence signal corresponding to the lower torque value or more, the torque occurrence signal corresponding to the intermediate torque value or more, and the torque occurrence signal corresponding to the higher torque value or more, in sequence, within the predetermined time, the end of the regular grinding of the electrode tips can be determined.

The controller, after the start of the grinding, receives the torque occurrence signal corresponding to the lower torque value or more, the torque occurrence signal corresponding to the intermediate torque value or more, and the torque occurrence signal corresponding to the higher torque value or more in sequence from the servo motor unit, the elapsed times may be too short. That is because the grinded electrode tip has a different shape, the cutter cannot regularly cut due to, for example, the end of its life, etc. In such cases, the irregular grinding of the servo motor when the maximum torque does not occur can be detected, too.

The controller receives, from the servo motor unit, the torque occurrence signal corresponding to the lower torque value or more, the torque occurrence signal corresponding to the intermediate torque value or more, and the torque occurrence signal corresponding to the higher torque value or more, in sequence, within the predetermined time, and if the regular grinding time has elapsed, the controller can determine the end of the regular grinding operation of the electrode tip to stop further grinding to prevent the electrode tips from being cut too much, leading to reduction of the consumption amount of the electrode tips.

DETAILED DESCRIPTION

Figure 1:
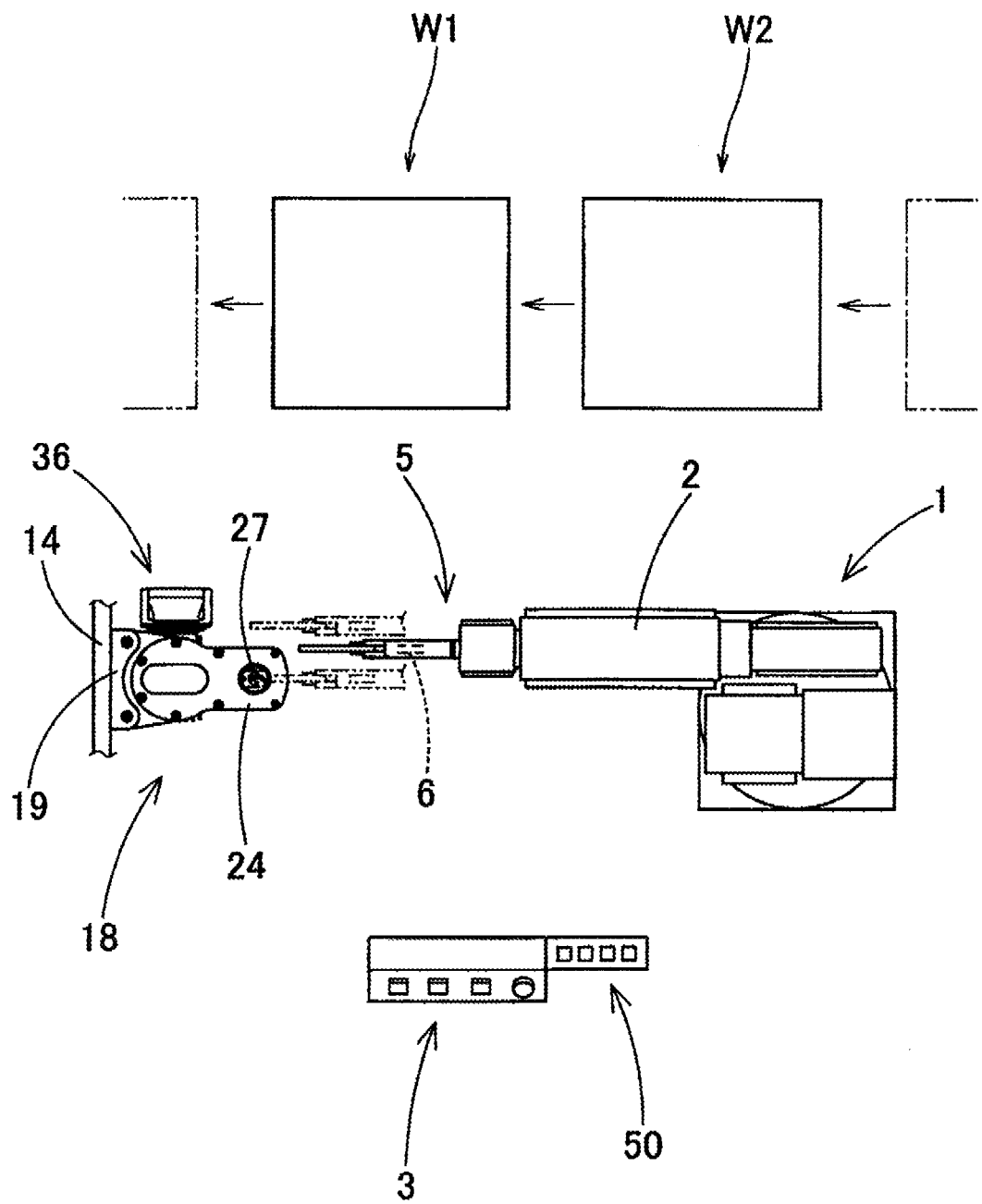
FIG. 1 is a schematic plan view illustrating a vicinity of a tip dresser for use in one embodiment of the present disclosure.
Figure 2:
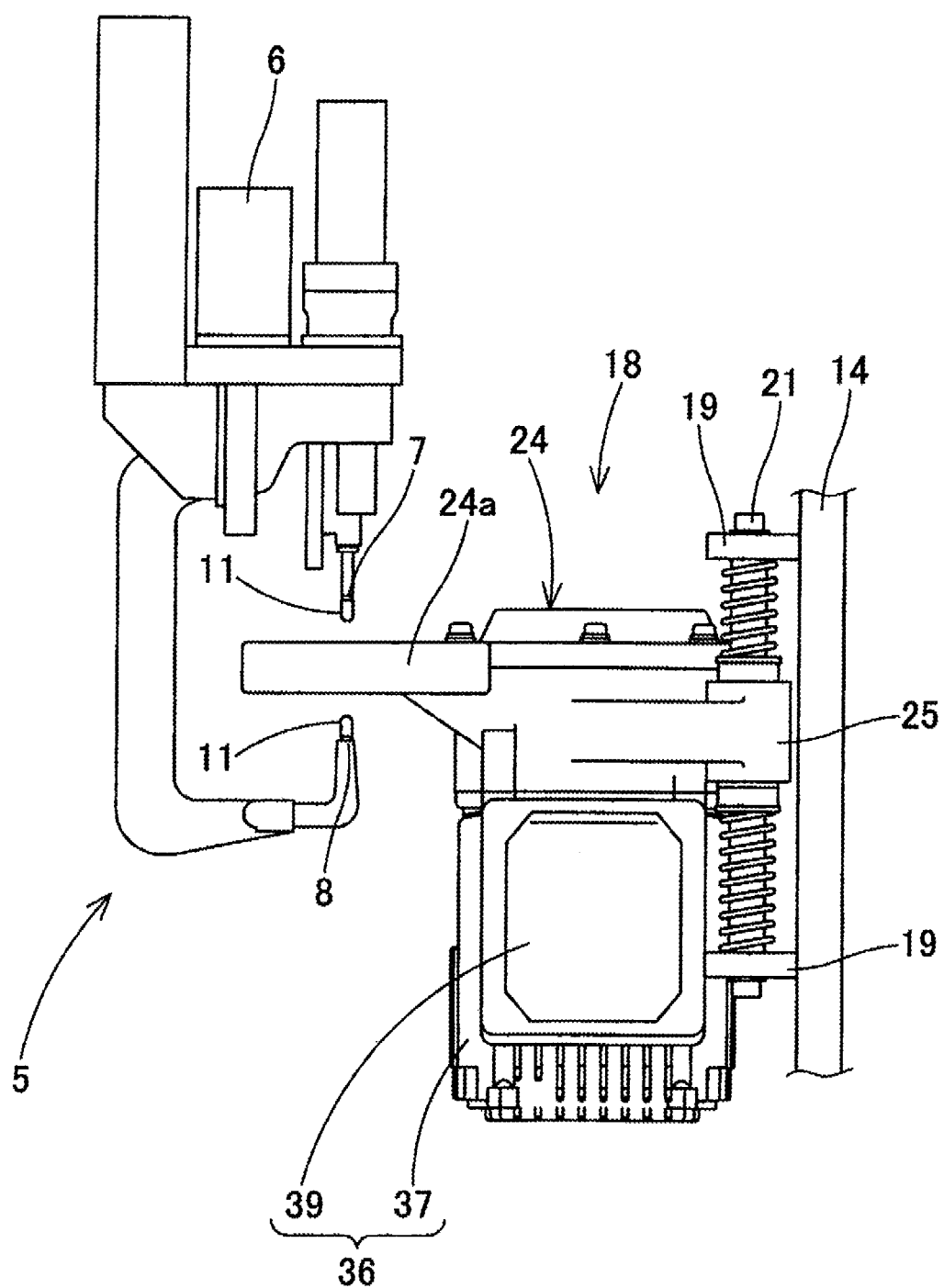
FIG. 2 is a schematic side view of the tip dresser in the embodiment.

An embodiment of the present disclosure will be described in detail hereinafter with reference to the drawings. A welding gun 5 holding a pair of electrode tips 11, 11 for use in the embodiment is held in an end of an arm 2 of a multi joint welding robot 1 as illustrated in FIGS. 1 and 2, and is configured such that the pair of electrode tips 11, 11 are inserted into shanks 7 and 8 facing each other. The welding gun 5 is a widely used servo gun, and is configured to have a position control function such that each of the electrode tips 11, 11 is held to be moved by means of a servo motor 6 with a built-in encoder, and the pair of electrode tips 11, 11 equally approach each other. Additionally, the welding gun 5 has an operation function to perform rotation speed control/torque control, thereby performing a position control, a pressure control of the electrode tips 11, 11, etc.

Additionally, a reference character 3 illustrated in FIG. 1 is a control unit for controlling the movement of the welding robot 1 including the welding gun 5. Reference characters W1 and W2 represent processing sites on a welding line where the welding robot 1 performs a welding process. At the processing sites W1 and W2, metal plates which are not shown are connected to each other by performing the spot welding at predetermined times and predetermined portions.

Figure 3:
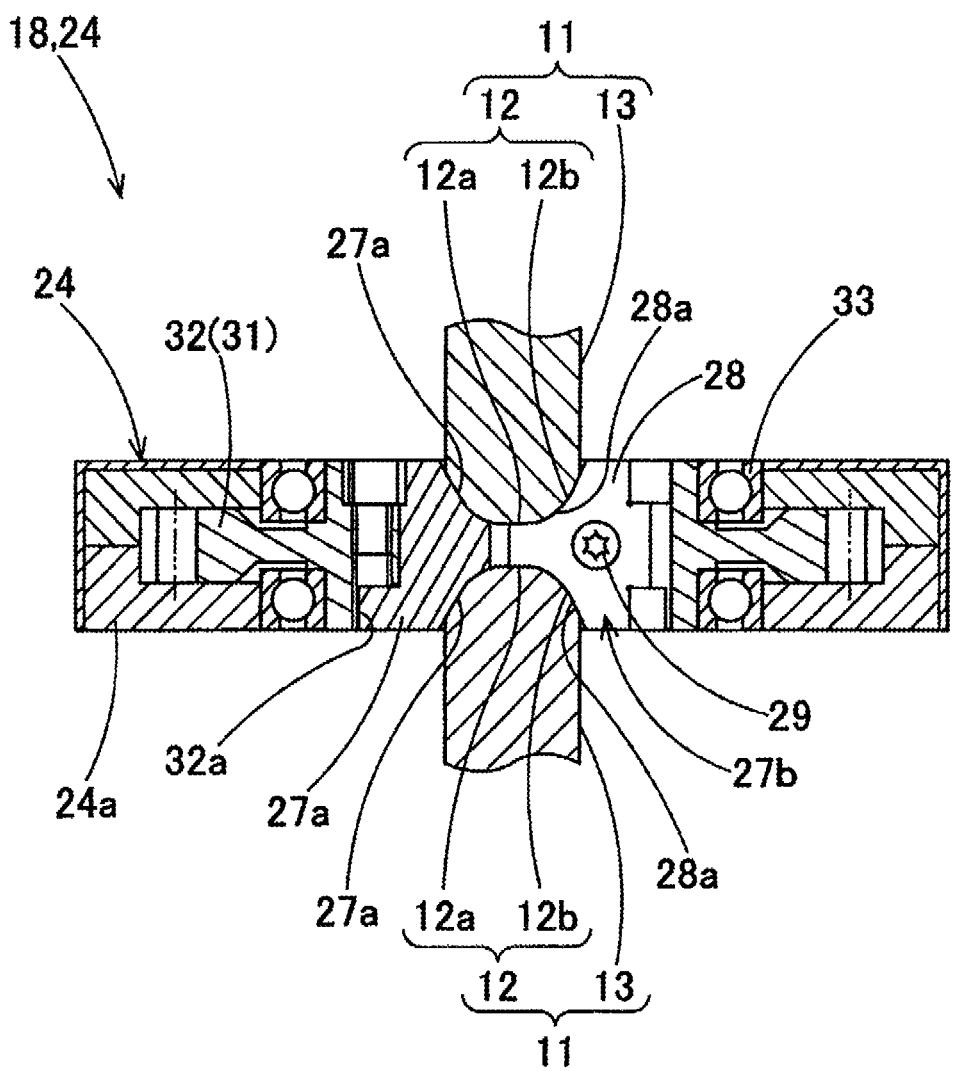
FIG. 3 is a vertical cross-sectional view of the tip dresser when electrode tips are grinded in the embodiment.
Figure 4:
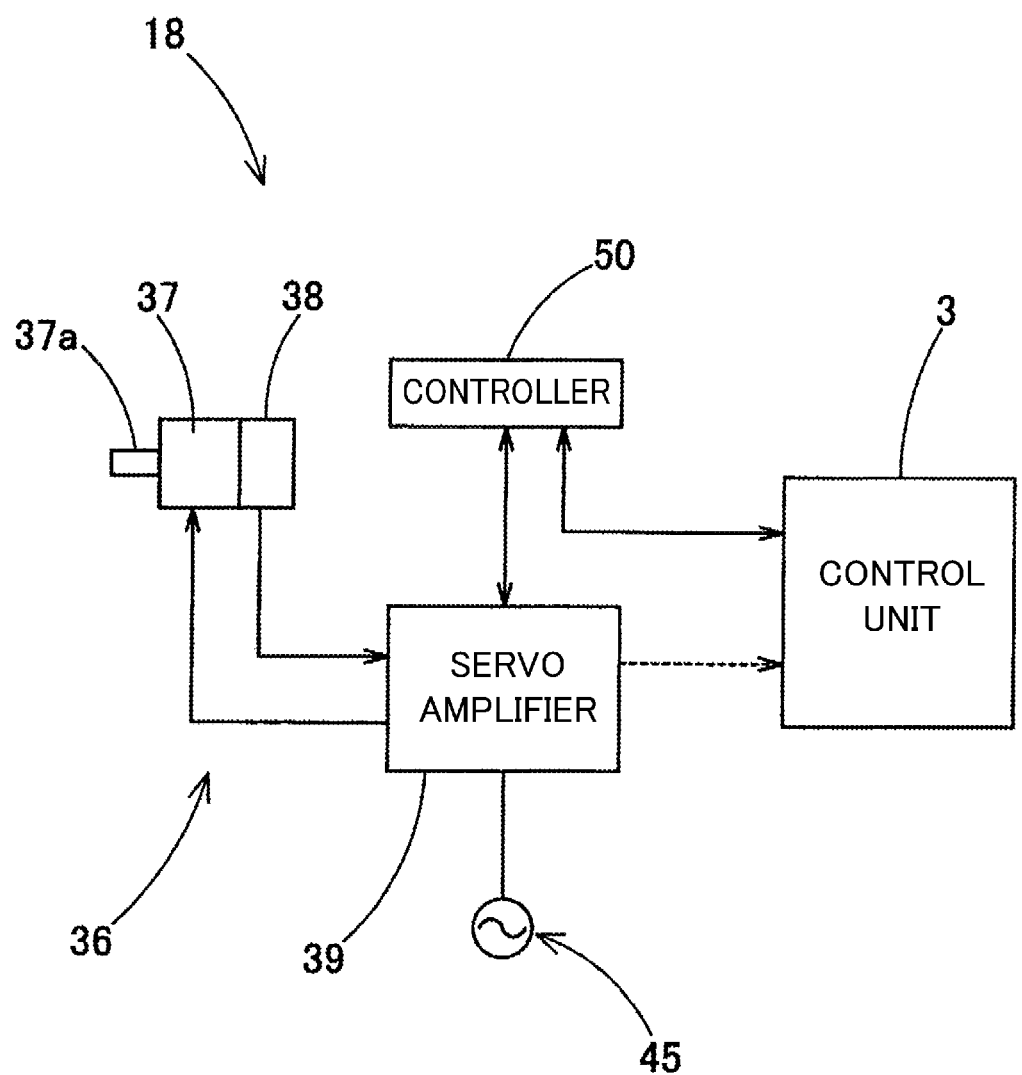
FIG. 4 is a block diagram of the tip dresser in the embodiment.

As illustrated in FIGS. 2-4, the tip dresser 18 includes a dresser body 24, a servo motor unit 36, and a controller 50. The dresser body 24 includes a holder 27 holding a cutter 28 capable of cutting ends 12 of the pair of electrode tips 11, 11. The rotation of a servo motor 37 in the servo motor unit 36 causes the holder 27 to rotate together with the cutter 28, whereby the end 12 of the electrode tip 11 is cut and grinded by the cutter 28.

As illustrated in FIG. 3, the holder 27 has recesses 27a in upper and lower surfaces thereof such that the recesses 27a are associated with the proper shapes of the ends 12 of the electrode tips 11, and has an ejection hole 27b for ejecting shavings which have been cut. The cutter 28 is mounted on the wall surface of the ejection hole 27b by a mounting screw 29, and cutting edges 28a, 28a are positioned in inner circumferential surfaces of the recess 27a, 27a, respectively. Therefore, if the ends 12 of the electrode tips 11, 11 are inserted so as to contact the respective recesses 27a, 27a of the rotating holder 27, the ends 12 which have been worn out are cut by the cutting edge 28a, 28a of the rotating cutter 28 to be grinded to have a proper shape.

The cutting edge 28a is configured to grind an end surface 12a of the end 12 of the electrode tip 11, and a diameter-increasing portion 12b whose diameter increases with increasing a distance from the end surface 12a to be linked to a cylindrical proximal portion 13 of the electrode tip 11.

The holder 27 is housed in and fixed to a housing 32a of a large gear 32 of a gear mechanism 31, and the large gear 32 is rotatably supported by a bearing 33 inside a case 24a.

The gear mechanism 31 includes a driving gear, which is not shown, provided in a rotation shaft 37a (see FIG. 4) of the servo motor 37, an intermediate gear, which is not shown, fit into the driving gear and the large gear 32, and the large gear 32. The rotation of the servo motor 37 causes the holder 27 housed in the large gear 32 to rotate with the cutter 28.

The servo motor unit 36 includes the servo motor 37 for alternating current, an encoder 38 capable of detecting the angle location and rotation speed of the rotation shaft 37a of the servo motor 37, and a servo amplifier 39 configured to control the rotation of the servo motor 37. An AC power source 45 is connected to the servo motor 37.

The servo amplifier 39 in the embodiment is equipped with a microprocessor, and upon receiving a control signal from the controller 50, controls the rotation shaft 37a of the servo motor 37 such that the rotation shaft 37a rotates at a predetermined rotation speed. The servo amplifier 39 of the embodiment has a torque limit function (protective mechanism) so as to stop the rotation of the servo motor 37 to prevent the servo motor 37 from being broken if the load torque of the servo motor 37 reaches the maximum torque value (stall torque) based on, for example, a current value of current flowing in the servo motor 37.

The servo amplifier 39 in the embodiment is further configured to, based on, for example, a current value of current flowing in the servo motor 37, output an ON signal to the controller 50 every time when the load torque reaches any of three levels during fluctuation of the load torque of the servo motor 37 in regular grinding.

Figure 5:
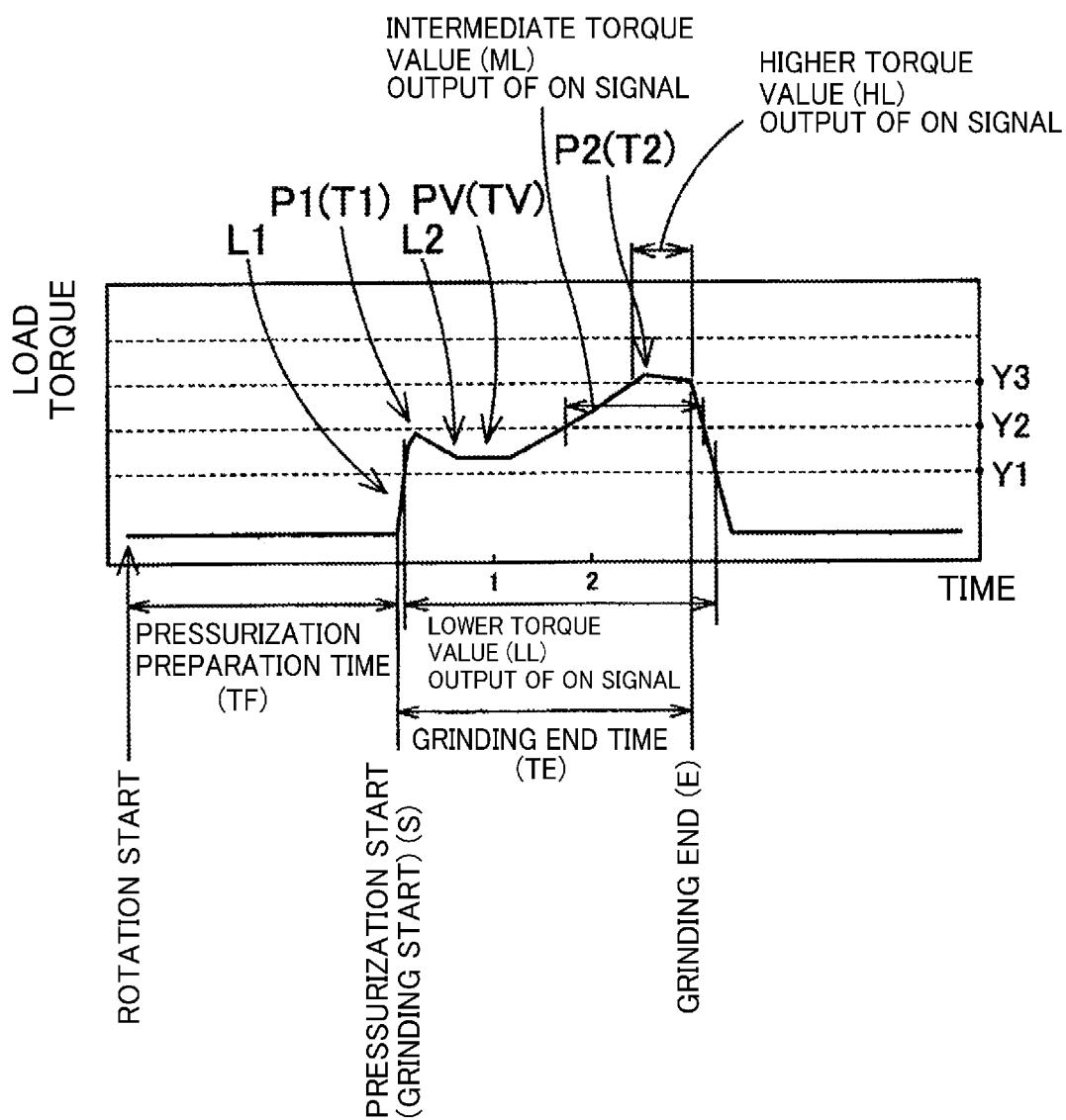
FIG. 5 is a waveform diagram showing the effective torque of the servo motor with time elapsed in regular grinding.

FIG. 5 shows a waveform indicating an increase and decrease in the load torque with time elapsed when the electrode tips 11, 11 are regularly grinded. Thus, the waveform is such that the load torque, although it does not increase during a preparation time of grinding after the start of the rotation of the servo motor 37 and immediately before a contact of the electrode tip 11 with the holder 27 (pressurization start), increases after the start of the pressurization of the holder 27 by the electrode tip 11, i.e., a grinding start S and an increasing line L1 that increases toward the right is drawn to reach a first peak value P1, then, the load torque decreases and a recessed curved line L2 is drawn to reach the minimum value PV, and after the decrease, the load torque reaches a second peak value P2 that is higher than the first peak value P1, and then, the load torque is retained and a grinding end E is reached. A state of grinding where the increasing line L1 is drawn to reach the first peak value P1 refers to a state where, when the end 12 of the electrode tip 11 contacts the inner circumferential surface of the recess 27a of the holder 27, a projection occurring in part of the end 12 is cut while being contacted under large pressure. Subsequently, a state of grinding where the recessed curved line L2 is drawn refers to a state where the projection of the end 12 of the electrode tip 11 gets smaller while partially making the contact, resulting in a decrease in the load torque, and then, the projection disappears to reach a state where the whole area of portions to be the end surface 12a and the diameter-increasing portion 12b of the end 12 are associated with the inner circumferential surface and widely cut from a state where the portions are partially associated with the surface. When the torque reaches the second peak value P2, the end 12 will have been grinded so as to have a predetermined shape.

The elapsed time TE that has elapsed since the grinding start S until the grinding end E is predetermined (for example, three seconds). An elapsed time T1 since the grinding start S and until the first peak value P1 is reached is less than one second (approximately 0.2 second in the example of the figure), a time TV to reach the minimum value PV is approximately one second, and an elapsed time T2 since the grinding start S and until the second peak value P2 is reached is two seconds or more and less than three seconds (2.6 seconds in the example of the figure).

In the regular grinding of the electrode tip 11 in the embodiment, the diameter of the electrode tip 11 is 16ϕ, the welding pressure of the welding gun 5 is 120 kgf/cm², and the rotation speed of the holder 27 is 177 rpm to perform the grinding.

A pressurization preparation time TF since the rotation start and until the pressurization start (grinding start) S is three seconds in the embodiment.

In the embodiment, the servo amplifier 39 is configured to, when the torque occurs to reach a lower torque value Y1 or more, an intermediate torque value Y2 or more, and a higher torque value Y3 or more which are sequentially higher within the range of the load torque of the servo motor 37, output torque occurrence signals corresponding to the respective torque values Y1, Y2, and Y3 to the controller 50. Thus, the servo amplifier 39 outputs, to the controller 50, a lower torque value ON signal (LL ON signal) at the lower torque value Y1 or more, an intermediate torque value ON signal (ML ON signal) at the intermediate torque value Y2 or more, and a higher torque value ON signal (HL ON signal) at the higher torque value Y3 or more, and after outputting the ON signals (LL ON signal, ML ON signal, HL ON signal), stops outputting the respective ON signals (LL ON signal, ML ON signal, HL ON signal) when the value of the load torque is lower than any of the respective torque values Y1, Y2, and Y3.

In the embodiment, the lower torque value Y1 is lower than the minimum value PV obtained at the time after the first peak value P1 and before the second peak value P2, and the intermediate torque value Y2 is lower than the second peak value P2 and higher than the first peak value P1. The higher torque value Y3 is set to be higher than the intermediate torque value Y2 and lower than the second peak value P2.

Figure 6:
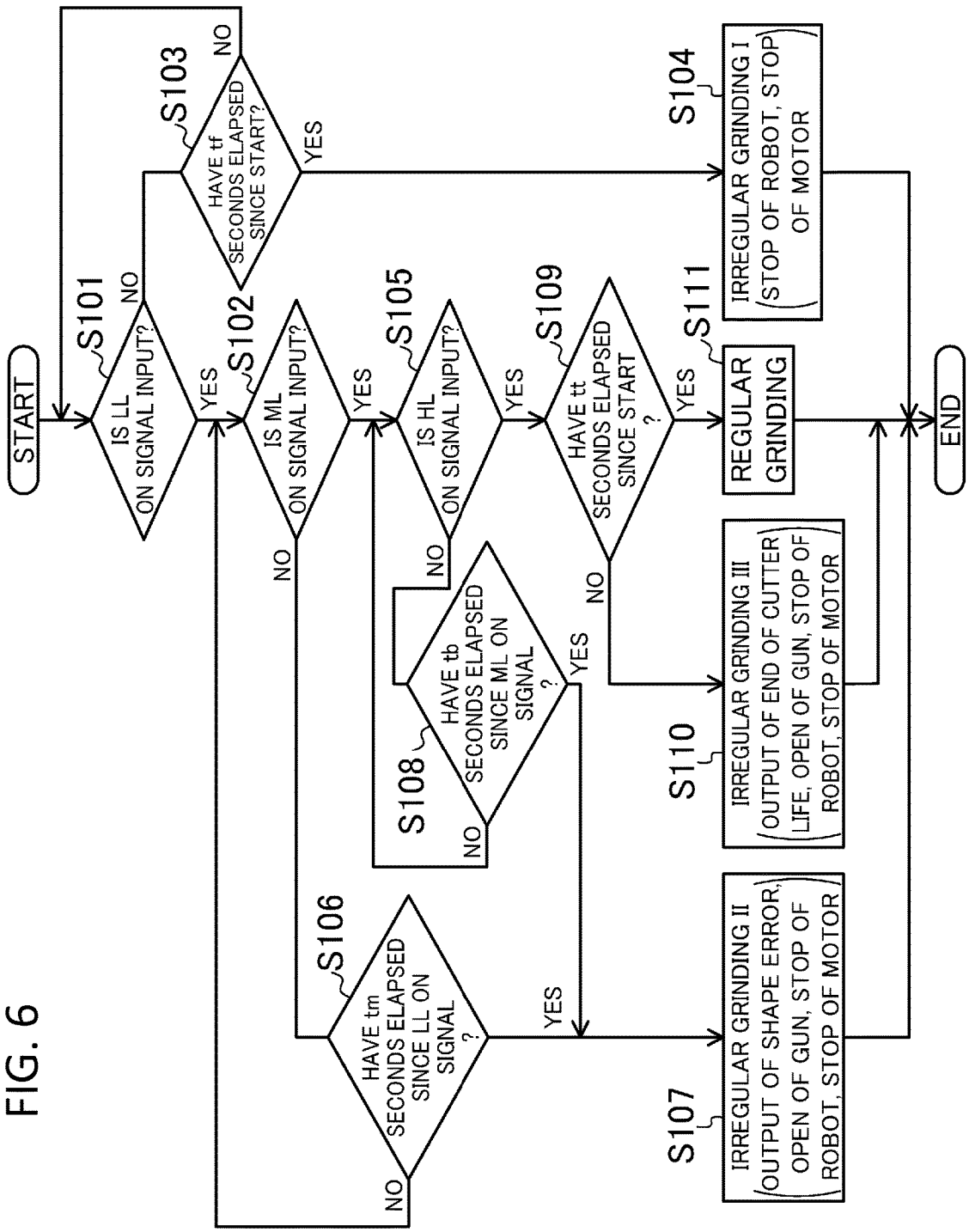
FIG. 6 illustrates a flow chart in which a controller detects irregular grinding at the grinding of the tip dresser.

Upon receiving a signal for grinding the electrode tips 11, 11 from the control unit 3 of the welding robot 1 after the electrode tips 11, 11 performs spot welding at predetermined times, the controller 50 outputs a control signal to the servo amplifier 39 of the servo motor unit 36 so as to allow the servo motor 37 to rotate at a predetermined rotation speed to start the operation of grinding, and upon receiving a pressurization signal from the welding gun 5 after the welding gun 5 pushes the pair of electrode tip 11, 11 toward the rotating holder 27 of the dresser body 24, the controller 50 detects the grinding start S. The controller 50 detects irregular grinding, as shown in FIG. 6.

First, in step S101, it is determined whether the LL ON signal is input. If the signal is input (YES in step S101), the process goes to step S102, and if the signal is not input (NO in step S101), the process goes to step S103 to determine whether a tf second has elapsed since the start of the operation of the grinding (rotation start). In the embodiment, the time tf is four seconds in total which correspond to one second of the elapsed time since the grinding start S and until the minimum value PV and three seconds of the pressurization preparation time.

If four seconds (tf) have elapsed in step S103 (YES in step S103) since the rotation start, irregular grinding is detected, the progress goes to step S104, and the controller 50 outputs irregular grinding I. The irregular grinding I is caused because the gear of the gear mechanism 31 of the tip dresser 18 is broken, the welding gun 5 is located in a holder of a tip dresser in another position, etc. The controller 50 outputs an error signal to the control unit 3 and the servo motor unit 36 so as to stop the movement of the welding robot 1 and the rotation of the servo motor 37. At that time, the controller 50 may, for example, light a predetermined lamp so as to report the predetermined irregular grinding I.

Figure 7:
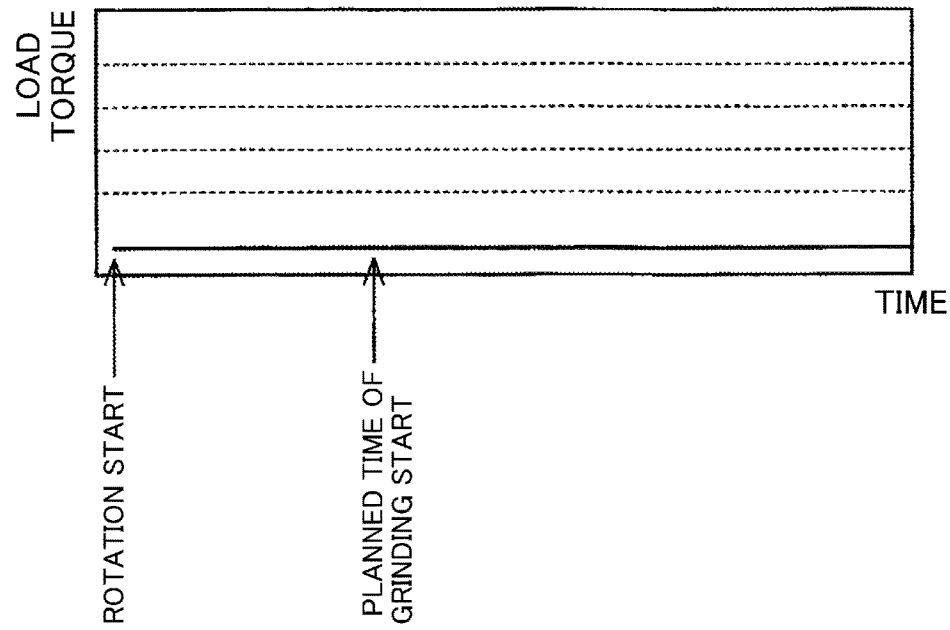
FIG. 7 is a waveform diagram showing the effective torque of the servo motor with time elapsed in an example of irregular grinding of the electrode tips.

The waveform of the load torque in the irregular grinding I can be exemplified in FIG. 7.

If the process goes to step S102 from step S101, the controller 50 determines whether the ML ON signal is input. If the ML ON signal is not input (NO in step S102), the process goes to step S106, and if the ML ON signal is input (YES in step S102), the process goes to step S105.

In step S106, it is determined whether a tm second (for example, a time that is two to three times longer than the elapsed time in the regular grinding, and in the embodiment, five seconds that are three times longer than the elapsed time in the regular grinding) has elapsed since the input of the LL ON signal, and if such a time has not elapsed (NO in step S106), the process goes back to step S102, and if such a period has elapsed (YES in step S106), the process goes to step S107 and the controller 50 outputs irregular grinding II. The irregular grinding II is caused because, though the tip dresser 18 is not mechanically broken, the end 12 of the electrode tip 11 is deformed (worn out) too much, the electrode tip 11 is inappropriately held in the shank 7 or 8 of the welding gun 5 and is kept idle, the welding gun 5 insufficiently pressures the tip dresser 18, etc. The controller 50 outputs an error signal to the control unit 3 such that the welding gun 5 is opened to stop the movement of the welding robot 1 and the shape error of the electrode tip 11 is displayed, and outputs an error signal to the servo motor unit 36 so as to stop the rotation of the servo motor 37. At that time, the controller 50 may, for example, light a predetermined lamp so as to report the predetermined irregular grinding II.

Figure 8:
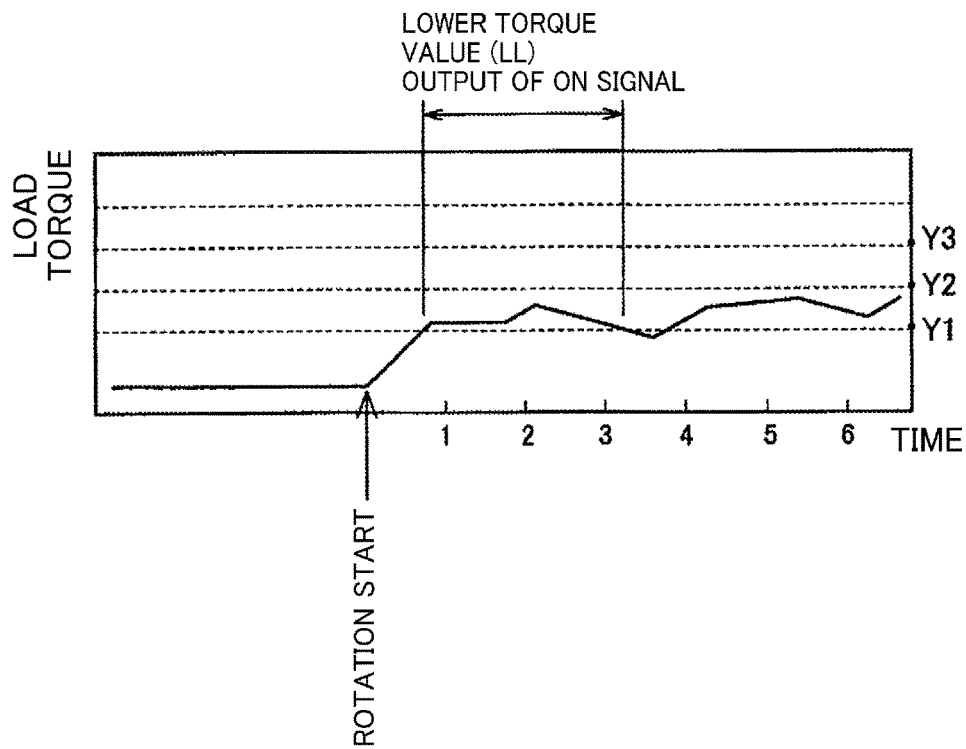
FIG. 8 is a waveform diagram showing effective torques of the servo motor with time elapsed in another example of irregular grinding of the electrode tips.

The waveform of the load torque in the irregular grinding II can be exemplified in FIG. 8.

If the process goes to step S105 from step S102, the controller 50 determines whether the HL ON signal is output. If the HL ON signal is not input (NO in step S105), the process goes to step S108, and if the HL ON signal is input (YES in step S105), the process goes to step S109.

In step S108, it is determined whether a tb second (for example, a time that is two to three times longer than the elapsed time in the regular grinding, and in the embodiment, three seconds that is about three times longer than the elapsed time in the regular grinding) has elapsed since the input of the ML ON signal, and if such a time has not elapsed (NO in step S108), the process goes back to step S105, and if such a period has elapsed (YES in step S108), the process goes to step S107 and the controller 50 outputs irregular grinding II.

If the process goes to step S109 from step S105, the controller 50 determines whether a tt second (for example, two seconds that are slightly shorter than a period of reaching the second peak value P2 in the regular grinding) has elapsed since the grinding start S. If two seconds have not elapsed since the grinding start S (NO in step S109), the process goes to step S110, and the controller 50 outputs irregular grinding III.

The irregular grinding III is caused because the grinded electrode tip has a different shape, the cutter cannot cut due to the end of its life, etc., the pressurization of the welding gun 5 increases, etc. The controller 50 outputs an error signal to the control unit 3 such that the welding gun 5 is opened to stop the movement of the welding robot 1 and the life of the cutter 28 is displayed, and outputs an error signal to the servo motor unit 36 so as to stop the rotation of the servo motor 37. At that time, the controller 50 may, for example, light a predetermined lamp so as to report the predetermined irregular grinding III.

Figure 9:
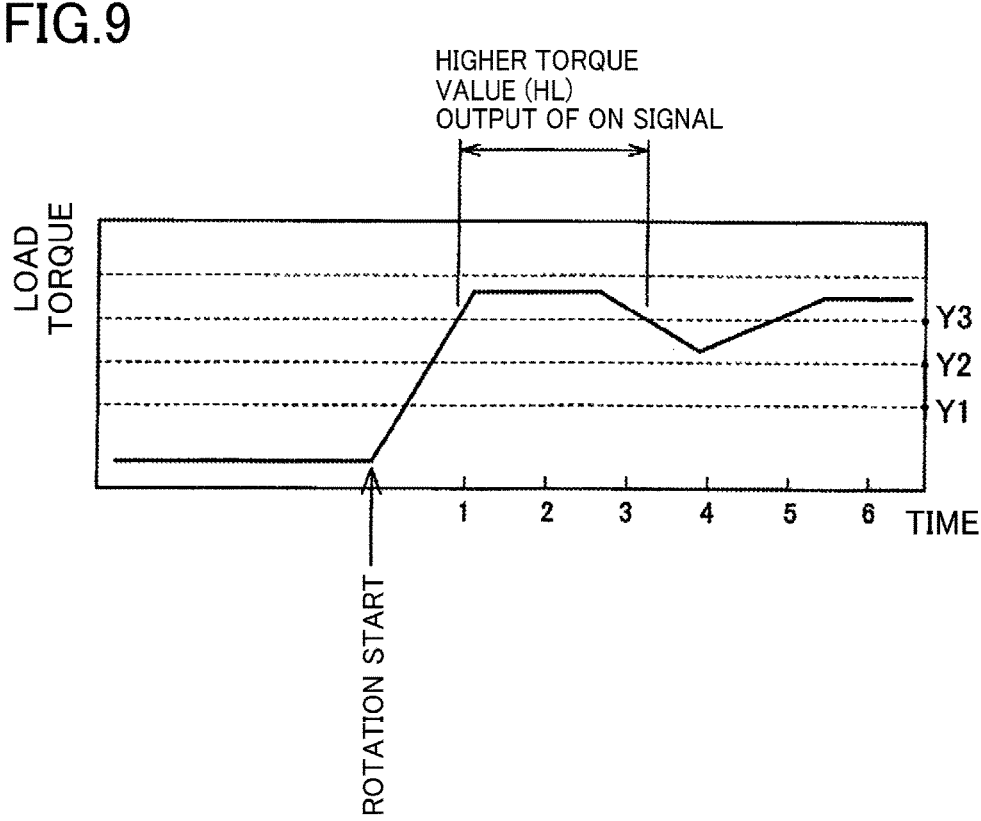
FIG. 9 is a waveform diagram showing effective torques of the servo motor with time elapsed in a still another example of irregular grinding of the electrode tips.

The waveform of the load torque in the irregular grinding III can be exemplified in FIG. 9.

If two seconds have elapsed in step S109 since the grinding start S (YES in step S109), the process goes to step S111 and the controller 50 determines that the grinding can be regularly ended to output a grinding end signal to the servo motor unit 36 such that, after the servo motor 37 has been rotary (rotatably?) driven while a grinding end time TE has elapsed from the grinding start S to grinding end E, the rotation of the servo motor 37 is stopped, and to output a grinding end signal to the control unit 3 such that the welding gun 5 is opened and the welding robot 1 can move on to the next operation.

In other words, the controller 50 sequentially receives torque occurrence signals, namely, the LL ON signal, the ML ON signal, and the HL ON signal respectively corresponding to the lower torque value Y1 or more, the intermediate torque value Y2 or more, and the higher torque value Y3 or more from the servo motor unit 36 within a predetermined time, and after the a regular grinding time (TE) has elapsed, the controller 50 can determine that the regular grinding operation of the electrode tip 11 is ended to stop further grinding to prevent the electrode tip 11 from being cut too much, leading to reduction of the consumption amount of the electrode tip 11.

Figure 10:
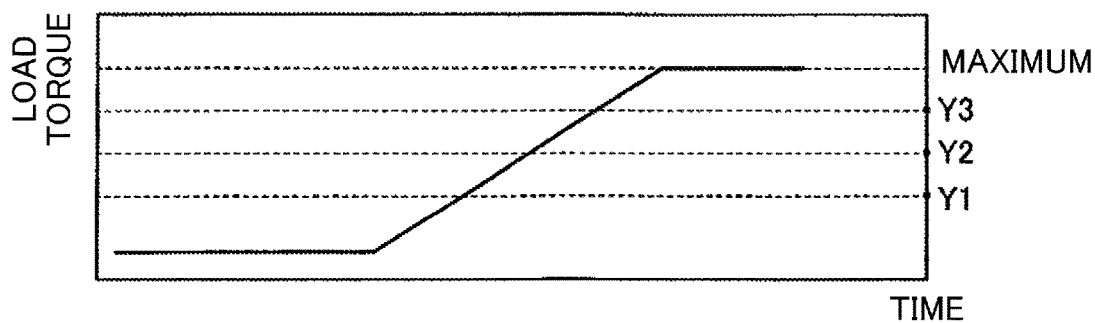
FIG. 10 is a waveform diagram showing effective torques of the servo motor with time elapsed in a still another example of irregular grinding of the electrode tips.

In the tip dresser 18 of the embodiment, the servo amplifier 39 has a torque limit (protective mechanism) such that, when the load torque of the servo motor 37 reaches the maximum torque (stall torque) based on, for example, a current value of current flowing in the servo motor 37, the rotation of the servo motor 37 is stopped to prevent the servo motor 37 from being broken, and in such a case, the controller 50 receives the signal and outputs the error signal to the control unit 3 such that the welding gun 5 is opened and the welding robot 1 is stopped. The waveform of the load torque at that time can be exemplified in FIG. 10.

As stated above, in the method of grinding the electrode tip in the embodiment, unless the controller 50 receives the LL ON signal within the predetermined time, the controller 50 detects the following irregularities as the irregular grinding I, for example:
1. The welding gun holding the electrode tip is positioned in another tip dresser; and
2. The servo motor is kept idle due to a mechanical break of the gear mechanism.

When the controller 50, even if receiving the LL ON signal, does not receive the ML ON signal within a predetermined time or the controller 50, even if receiving the ML ON signal, does not receive the HL ON signal within a predetermined time, the controller 50 detects that the following irregularities as the irregular grinding II, for example:
3. The end 12 of the electrode tip 11 is deformed (worn out) too much;
4. The electrode tip 11 is inappropriately held in the shank 7 or 8 of the welding gun 5 and is kept idle; and
5. The welding gun 5 insufficiently pressures the tip dresser 18.

Furthermore, the controller 50, after receiving the LL ON signal and the ML ON signal, receives the HL ON signal within a shorter period, the controller 50 detects the following irregularities as the irregular grinding III, for example:
6. The pressurization force of the welding gun 5 increases to be higher than a predetermined value; and
7. The grinded electrode tip has a different shape; and
8. The cutter cannot regularly cut due to the end of its life.

In other words, with the method of grinding the electrode tip in the embodiment, various types of the irregular grindings I, II, and III are found, and irregular grinding can be detected when the maximum torque of the servo motor 37 does not occur, whereby the grinding can be quickly and properly stopped and the irregular grinding can be quickly and properly handled.

The method of grinding in the embodiment can prevent welding in a state where cutting may not be performed due to the end of the life of the cutter, welding in a state where cutting is not sufficiently performed due to a mechanical break of the tip dresser, and the wearing out (shortened life) of the electrode tip due to too much cutting in the grinding.

In the method of grinding in the embodiment, the controller 50 can make predetermined determinations based on the ON signals of digital signals from the servo motor unit 36, and therefore, the controller 50 easily receives and outputs the digital signals from and to the control unit 3 of the welding robot 1, and is suitable for welding sites using the welding robot 1.

In the embodiment, the ON signals output from the servo amplifier 39 corresponds to three levels of the torque value, namely, the lower torque value Y1, the intermediate torque value Y2, and the higher torque value Y3. The ON signals may have two types, namely, the LL ON signal and the HL ON signal which correspond to two levels of the torque values, namely, the lower torque value Y1 and the higher torque value Y3, respectively.

In a controller 50A in this case, step S102 and step S106 in the flow chart shown in FIG. 6 may be deleted, and the elapsed time tb determined in step S108 may be about two to three times longer than that in the regular grinding after receiving the LL ON signal, for example, eight seconds that are about three times longer than that in the regular grinding.

In such a case, even after the rotation is started in grinding, the controller 50A may not receive the torque occurrence signal (LL ON signal) corresponding to the lower torque value Y1 or more from the servo motor unit 36. This is because the welding gun 5 holding the electrode tip 11 is positioned in another dresser, the servo motor 37 is kept idle, etc. The irregular grinding I (see step S104 in FIG. 6) of the servo motor 37 when the maximum torque does not occur can be detected.

The controller 50A, after the grinding is started, may receive the torque occurrence signal (LL ON signal) corresponding to the lower torque value Y1 or more from the servo motor unit 36, and may not receive the torque occurrence signal (LL ON signal) corresponding to the higher torque value Y3 or more. This is because the end 12 of the electrode tip 11 is deformed (worn out) too much though the tip dresser 18 is not mechanically broken, the electrode tip 11 is inappropriately held in the shank 7 or 8 of the welding gun 5 and is kept idle, the welding gun 5 insufficiently pressures the tip dresser 18, etc. The irregular grinding II (see step S107 in FIG. 6) of the servo motor 37 when the maximum torque does not occur can be detected.

Furthermore, if the controller 50A, after the start of the grinding, sequentially receives the torque occurrence signals, namely, the LL ON signal and the HL ON signal respectively corresponding to the lower torque value Y1 or more and the higher torque value Y3 or more from the servo motor unit 36 (if the process goes to step S101, S105, S109, S201 in FIG. 6), it can be detected that the regular grinding of the electrode tip 11 is ended.

Even if the controller 50A sequentially receives the torque occurrence signals, namely, the LL ON signal and the HL ON signal respectively corresponding to the lower torque value Y1 or more and the higher torque value Y3 or more from the servo motor unit 36 after the start of the grinding, its elapsed time may be too short (NO in step S109 shown in FIG. 6). That is because the grinded electrode tip has a different shape, and the cutter cannot regularly cut due to, for example, the end of its life, etc. In such a case, the irregular grinding III (see step S110 in FIG. 6) of the servo motor 37 when the maximum torque does not occur can be detected.

If the controller 50A sequentially receives, from the servo motor unit 36, the torque occurrence signals corresponding to the lower torque value Y1 or more and the higher torque value Y3 or more within a proper time, and the regular grinding time (TE) has elapsed, the controller 50A can determine the end of the regular grinding operation of the electrode tip 11 to stop further grinding to prevent the electrode tip 11 from being cut too much, leading to reduction of the consumption amount of the electrode tip 11.

Furthermore, in the embodiment, the ON signals output from the servo amplifier 39 corresponds to three levels of the torque value, namely, the lower torque value Y1, the intermediate torque value Y2, and the higher torque value Y3. For example, the servo amplifier 39 may be configured to output the torque occurrence signals when the torque value reaches one level or more of the lower torque value Y1, the minimum value PV, and the higher torque value Y3.

Even with such a configuration, a controller 50B in this case can detect any of the irregular grindings I, II, and III in FIG. 6, and can detect any of irregular grindings I, II, and III of the servo motor 37 when the maximum torque does not occur.

In step S106 and step S108 in the embodiment, it is determined that whether a time has elapsed since the output of the immediately preceding ON signal. Such an elapsed time may be set to two to three times longer, for example, three times longer than that since the grinding start S in the regular grinding, or may be set to an elapsed time since the rotation start in consideration of the pressurization preparation time TF. The elapsed time tt in step S109 may also be set as an elapsed time since the rotation start in consideration of the pressurization preparation time TF.

The various types of the elapsed time (may be various types of confirmation time or standby time) tf, tm, tb, and tt stated above are set in consideration of a variation time with the elapsed time in the regular grinding, and are not limited to those in the embodiment, and may be increased or decreased as appropriate as long as the irregular grindings I, II, and III can be properly detected.

What is claimed is:

1. A method for grinding a pair of electrode tips held in a welding gun by a tip dresser including a holder holding a cutter capable of cutting each ends of the pair of the electrode tips, a servo motor unit having a servo motor serving as a driving source for allowing the holder to rotate in order to cut the pair of the electrode tips and a servo amplifier controlling the rotation of the servo motor, and a controller controlling an operation of the servo motor unit, the method comprising, starting the rotation of the servo motor, starting exerting pressure on the holder by the electrode tips in grinding the electrode tips, determining a waveform of grinding the electrode tips in a diagram plotting an elapsed time in grinding of the electrode tips as an abscissa and a value of a load torque applied on the servo motor as an ordinate, the elapsed time after the start of exerting pressure on the holder by the electrode tips in grinding of the electrode tips being divided into times T1, TV, and T2, where T1<TV<T2, and a waveform of regular grinding of the electrode tips being defined such that the load torque increases to reach a first peak value P1 in the time T1 since the start of exerting pressure on the holder by the electrode tips, then the load torque decreases to reach a minimum value PV in the time TV, and after the minimum value PV, the load torque increases to reach in the time T2 a second peak value P2 that is higher than the first peak value P1, and is retained, outputting from the servo motor unit to the controller a torque occurrence signal corresponding to a lower torque value Y1 when occurrence of the load torque reaching the lower torque value Y1 is detected, a torque occurrence signal corresponding to an intermediate torque value Y2 when occurrence of the load torque reaching the intermediate torque value Y2 higher than the lower torque value Y1 is detected, and a torque occurrence signal corresponding to a higher torque value Y3 when occurrence of the load torque reaching a higher torque value Y3 higher than the intermediate torque value Y2 is detected, the lower torque value Y1 being set to 0<Y1<PV, the intermediate torque value Y2 and the higher torque value Y3 being set to P1<Y2<Y3<P2, detecting each irregular grinding of the electrode tips when the controller does not receive the torque occurrence signal corresponding to the lower torque value within a corresponding elapsed time tf after the start of exerting pressure on the holder by the electrode tips, when the controller does not receive the torque occurrence signal corresponding to the intermediate torque value within a corresponding elapsed time tm after receiving the torque occurrence signal corresponding to the lower torque value, and when the controller does not receive the torque occurrence signal corresponding to the higher torque value within a corresponding elapsed time tb after receiving the torque occurrence signal corresponding to the intermediate torque value, and further detecting irregular grinding of the electrode tips when the controller receives all the torque occurrence signals corresponding to the lower, intermediate, and higher torque values within a corresponding elapsed time tt, where tt<T2, after the start of exerting pressure on the holder by the electrode tips, and stopping the rotation of the servo motor when irregular grinding is detected.

* * * * *